(12) United States Patent  (10) Patent No.: US 6,543,150 B2
Matsumiya et al.  (45) Date of Patent: Apr. 8, 2003

(54) FORM MEASURING SENSOR AND FORM MEASURING INSTRUMENT

(75) Inventors: Sadayuki Matsumiya, Kawasaki (JP); Susumu Yoshioka, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/842,919

(22) Filed: Apr. 27, 2001

(65) Prior Publication Data

US 2001/0034948 A1 Nov. 1, 2001

(30) Foreign Application Priority Data

May 1, 2000 (JP) ....................................... 2000-132361

(51) Int. Cl.[7] .............................................. G01B 5/20
(52) U.S. Cl. ....................... 33/553; 33/503; 33/DIG. 13
(58) Field of Search .................... 33/553, 503, DIG. 13, 33/549, 551, 556, 558, 559, 561, 542, 199 R, 199 B, 554

(56) References Cited

U.S. PATENT DOCUMENTS

| | | | | |
|---|---|---|---|---|
| 3,512,261 A | * | 5/1970 | Viollet | 33/559 |
| 4,377,911 A | * | 3/1983 | Iida et al. | 33/561 |
| 4,567,672 A | * | 2/1986 | Honda et al. | 33/559 |
| 4,778,313 A | * | 10/1988 | Lehmkuhl | 29/56.5 |
| 4,784,539 A | * | 11/1988 | Lehmkuhl | 33/505 |
| 5,150,529 A | * | 9/1992 | Collingwood | 33/503 |
| 5,269,068 A | * | 12/1993 | Seitz | 33/503 |
| 5,327,657 A | * | 7/1994 | Hajdukiewicz et al. | 33/503 |
| 5,404,649 A | * | 4/1995 | Hajdukiewicz et al. | 33/503 |
| 5,434,803 A | * | 7/1995 | Yoshida | 33/503 |
| 5,571,222 A | * | 11/1996 | Ludwig | 33/199 B |
| 5,611,147 A | * | 3/1997 | Raab | 33/1 PT |
| 5,615,489 A | * | 4/1997 | Breyer et al. | 33/503 |
| 6,047,479 A | * | 4/2000 | Galestien | 33/546 |
| 6,209,217 B1 | * | 4/2001 | Tsuruta et al. | 33/551 |
| 6,327,788 B1 | * | 12/2001 | Seddon et al. | 33/551 |
| 6,354,012 B1 | * | 3/2002 | Pettersson | 33/503 |
| 6,430,828 B1 | * | 8/2002 | Ulbrich | 33/503 |

FOREIGN PATENT DOCUMENTS

JP 2000-292156 A 10/2000

* cited by examiner

*Primary Examiner*—Diego Gutierrez
*Assistant Examiner*—Yaritza Guadalupe
(74) *Attorney, Agent, or Firm*—Oliff & Berridge, PLC

(57) ABSTRACT

A form measuring sensor (33) includes a stylus (40), a body (60) for holding the stylus (40) through an adaptor (50), the adaptor (50) including a stylus attachment (51) for the stylus (40) to be attached, a body attachment (52) to be attached to the body (60), and an elastically deformable connector (53) for connecting the stylus attachment (51) and the body attachment (52), where the sensor (33) and a threaded hole (100) are relatively moved to cause an elastic deformation of the connector (53) allowing a displacement of the stylus (40) in accordance with surface configuration of the threaded hole (100), so that the elastic deformation of the connector (53) is detected by a strain gauge (71) to detect the displacement of a contact portion (42A) to collect continuous configuration data of the threaded hole (100) within a short period of time.

11 Claims, 7 Drawing Sheets

FORM MEASURING SENSOR AND FORM MEASURING INSTRUMENT

BACKGROUND OF THE INVENTION

1. Field of the Invention

The present invention relates to a form measuring sensor and a form measuring instrument. More specifically, it relates to a form measuring sensor and a form measuring instrument for measuring a form of a workpiece by touching a stylus on a surface of a thread.

2. Description of Related Art

There are various shapes of workpiece to be measured. Among the workpiece, a thread of a threaded workpiece (threaded hole=internal thread, threaded shaft=external thread) has parameters (characteristic value) for defining characteristic thereof. Such parameters include thread pitch a, effective thread portion length b, incomplete thread portion c, threaded hole depth d etc. as shown in threaded hole 100 of FIG. 7. A coordinates measuring machine is used for measuring respective parameters a to d of the threaded hole 100.

In order to measure the thread by the coordinates measuring machine, a touch signal probe or a scanning probe can be used.

When a touch signal probe is used, the contact portion of the touch signal probe is brought into contact with the surface of the thread and the coordinates value at the time is read. The thread form is measured by obtaining coordinates value at a desired plurality of points by repeating the above operation.

On the other hand, when the scanning probe is used, the scanning probe and the thread are relatively moved while a contact portion of the scanning probe keeps in contact with the thread surface with a constant measurement force. The thread form is measured by continuously collecting the coordinates value of the contact portion.

However, following disadvantages occur in measuring the thread form using the above-described coordinates measuring machine.

When the touch signal probe is used to measure the workpiece, the touch signal probe has to touch the thread surface at respective points. Accordingly, for measuring the respective parameters of, for instance, the threaded hole 100, the data have to be continuously collected by multi-point measurement, so that considerable time is required for measurement.

On the other hand, when the scanning probe is used to measure the workpiece, since contact and separation are not required between the probe and the thread surface for respective points unlike the measurement using the touch signal probe, the data can be continuously collected within a short period of time. However, the scanning probe having a mechanism for continuously detecting the coordinates value of the contact portion while keeping the contact portion in contact with the thread surface is expensive in itself.

An object of the present invention is to provide a form measuring sensor and a form measuring instrument capable of continuously collecting workpiece surface form data within a short time and capable of being inexpensively constructed.

SUMMARY OF THE INVENTION

A form measuring sensor according to an aspect of the present invention includes: a stylus having a contact portion to be in contact with a workpiece surface at a first end; and a body for holding the stylus through an adaptor, the adaptor including a stylus attachment for a second end of the stylus to be attached, a body attachment to be attached to the body and an elastically deformable connector for connecting the stylus attachment and the body attachment, where the connector elastically deforms to allow a displacement of the stylus and the stylus attachment relative to the body attachment in accordance with a configuration of the surface of the workpiece, and where a deformation sensor for detecting the elastic deformation of the connector is provided.

In the present invention, the form measuring sensor is relatively moved in surface direction of the workpiece while the contact portion of the stylus keeps in contact with the surface of the workpiece. Then, the contact portion of the stylus scans the inner circumference of the workpiece and displaces in a direction approximately orthogonal with the relative movement, so that the stylus attachment of the adaptor attached with the stylus displaces in the same direction. On the other hand, since the body attachment of the adaptor is attached to the body relatively moving in the surface direction of the workpiece, the displacement direction becomes solely the relative movement direction. In other words, since the stylus attachment of the adaptor displaces approximately orthogonal with the relative movement direction and the body attachment does not displace relative to the body, the connector connecting the stylus attachment and the body attachment elastically deforms. Accordingly, the displacement of the stylus attachment, i.e. the displacement of the contact portion of the stylus can be represented by the elastic deformation of the connector. Continuous inner circumference form data of the workpiece can be collected within a short time by continuously detecting the elastic deformation of the connector with the deformation sensor.

The surface form of the workpiece is measured by detecting the elastic deformation of the connector which allows the displacement of the stylus by elastic deformation thereof, i.e. brings the stylus into contact with the workpiece with a constant measuring force. In other words, since the contact portion is brought into contact with the workpiece surface with a constant force and the displacement of the contact portion is continuously detected by the connector, the mechanism can be arranged simpler and more inexpensive than a scanning probe.

In the above arrangement, the stylus may preferably be formed in approximate L-shape and include a first arm extending along the surface of the workpiece with an end attached to the stylus attachment, and a second arm extending substantially orthogonal with the other end of the first arm and having the contact portion at an end thereof.

According to the above arrangement, since the stylus includes the first arm attached to the stylus attachment and extending along the surface of the workpiece, and the second arm extending approximately orthogonal with the first arm and having the contact portion, the stylus can be easily inserted into the threaded hole, and the contact portion can be securely brought into contact with the thread bottom of the threaded hole.

In the form measuring sensor according to the above arrangement of the present invention, the body may preferably be relatively moved along the surface of the workpiece while the contact portion of the stylus keeps in contact with the surface of the workpiece, and the contact portion of the stylus may preferably be disposed on a center line of the connector approximately parallel to the relative movement direction.

When the contact portion of the stylus scans the surface of the workpiece, some friction force is ordinarily generated between the contact portion and the workpiece surface. The friction force fluctuates according to measurement force applied to the contact portion and surface roughness of the workpiece etc. Specifically, when FIG. 6(A) is taken as an example, the stylus 110 is moved in a direction indicated by outlined arrow in the figure while an end of an approximately L-shaped stylus 110, i.e. a contact portion 111 keeps in contact with the surface of a workpiece W. At this time, measurement force Fv and friction force Ff are applied on the contact portion 111. When the length of the first arm 112 is L1 and the length of the second arm 113 is L2, a moment M1 applied to the other end 114 of the stylus 110 can be represented as follows:

$$M1=Fv*L1+Ff*L2$$

When the connector of the adaptor is located on the other end 114 of the stylus 110, the moment M1 is applied on the connector to cause elastic deformation of the connector. The elastic deformation of the connector varies in accordance with surface form of the workpiece W. Accordingly, the surface configuration of the workpiece W can be detected by detecting and continuously recording the variation of the elastic deformation. In other words, the variation of the elastic deformation of the connector is preferably caused only by the displacement of the connector 111. However, as shown in FIG. 6(A), when the connector is at the other end 114 (on the first arm 112) being offset from the contact portion 111 by the length L2, the moment generated by fluctuating friction force Ff causes change in the elastic deformation of the connector.

Accordingly, in the present invention, as shown in FIG. 6(B) for instance, the contact portion 111 of the stylus 110 is disposed on a center line C of the connector 115 approximately parallel with the relative movement direction (in an outlined arrow direction in the figure). Specifically, the connector is not disposed on the other end 114 of the stylus 110, but the connector 115 is disposed at a position offset from the other end 114 (the first arm 112) by the length L2. Incidentally, the connector 115 may be disposed by connecting the other end 114 and the connector 115 with a member 116 shown in double-dotted line in the figure (a stylus attachment 116, for instance). Accordingly, since the friction force Ff applied to the contact portion 111 when the stylus 110 is moved in the direction of the outlined arrow in the figure is approximately parallel with the center line C of the connector 115, the moment caused by the friction force Ff is not applied on the connector 115, so that moment M2 applied to the connector 115 can be represented as follows:

$$M2=Fv*L1$$

Accordingly, the friction force Ff applied to the contact portion 111 is not shown in the elastic deformation in a direction approximately orthogonal with the relative movement of the connector 15. Therefore, the influence of the friction force Ff fluctuating on account of surface roughness etc. can be eliminated, so that the displacement of the stylus in a direction approximately orthogonal with the relative movement can be reflected on the elastic deformation of the connector 115.

In the form measuring sensor according to the present invention, the deformation sensor may preferably include a strain gauge attached to the connector.

According to the above arrangement, since the deformation sensor for detecting the elastic deformation of the connector includes the strain gauge attached to the connector, inexpensive construction is possible.

In the form measuring sensor according to the present invention, the stylus may preferably be formed of a piano wire.

According to the above arrangement, since the stylus is made of piano wire, inexpensive construction is possible. Further, any desired form of stylus corresponding to the form of the workpiece can be easily formed by bending the piano wire.

A form measuring instrument according to another aspect of the present invention has a form measuring sensor according to the aforesaid aspect of the present invention, the instrument including: a holder for the form measuring sensor to be detachably attached; a relative movement mechanism for relatively moving the holder and the workpiece surface along a surface of the workpiece; and a controller for controlling the relative movement mechanism.

According to the above arrangement, the same function and effect as in the form measuring sensor of the aforesaid aspect of the present invention can be obtained. Specifically, since the contact portion contacts the workpiece surface with a constant force by the connector and the displacement of the connector is continuously detected by the connector, the continuous workpiece surface form data can be collected within a short time and inexpensive construction is possible.

The form measuring sensor according to the present invention may preferably be a sensor for measuring a thread form. By applying the present invention, a profile of a workpiece with relatively large undulations can be measured.

The form measuring instrument according to the present invention may preferably have the workpiece form sensor for measuring the thread form. Accordingly, the form measuring sensor can be easily exchanged with a sensor having appropriate size corresponding to the magnitude of the undulations of the thread.

In the form measuring instrument, a machining tool for threading the workpiece to form the thread may preferably be detachably attached to the holder.

According to the present arrangement, after, for instance, the tap is attached to the holder to form the threaded hole on the workpiece, the tap is detached from the holder and the form measuring sensor can be attached to measure the form of the workpiece.

Since thread cutting for finishing the workpiece into a final shape and measurement required after the thread cutting are conducted with the same instrument, the workpiece (object to be machined) is not necessary to be moved. Accordingly, positioning and position-calculation of the workpiece is not necessary, so that measurement time can be reduced.

In the form measuring instrument according to the present invention, a machining tool for forming a hole before threading of the thread on the workpiece may preferably be detachably attached to the holder.

According to the above arrangement, measurement of the workpiece form and formation of the workpiece on the object to be machined can be conducted simultaneously with measuring the workpiece form. In other words, the process from machining the hole before threading of the workpiece, to threading and measurement of the workpiece form can be conducted sequentially, so that machining and measurement time can be reduced.

A form measuring instrument according to another aspect of the present invention has the above-described form measuring sensor, which includes: a holder for the form measuring sensor to be detachably attached; a surface-direction relative movement mechanism for relatively moving the holder along a surface of the workpiece; a crosswise relative movement mechanism for relatively moving the holder along the workpiece surface in a direction intersecting the workpiece; and a controller for controlling the surface-direction relative movement mechanism and the crosswise relative movement mechanism, the controller controlling the crosswise relative movement mechanism so that an output of the deformation sensor becomes always constant.

According to the above arrangement, when the output of the deformation sensor changes in accordance with change in the attitude of the stylus on account of irregularities in measuring the workpiece surface by a scanning measurement, the controller controls the crosswise relative movement mechanism to change the stylus crosswise position relative to the workpiece surface, so that the attitude of the stylus relative to the workpiece surface stays always constant. Accordingly, great range of crosswise measurement can be obtained while avoiding circular error of the stylus.

In the above form measuring instrument, the form measuring sensor may preferably be a sensor for measuring a thread form. Accordingly, the form measuring sensor can be easily exchanged with a sensor of appropriate size in accordance with undulations of the thread form.

DETAILED DESCRIPTION OF PREFERRED EMBODIMENT(S)

An embodiment of the present invention will be described below with reference to attached drawings.

The present embodiment is for scanning measurement of thread configuration of a thread (threaded hole 100) formed on an object to be machined. A thread form measuring instrument 1 is used as a form measuring instrument according to the present invention.

Figure 1:
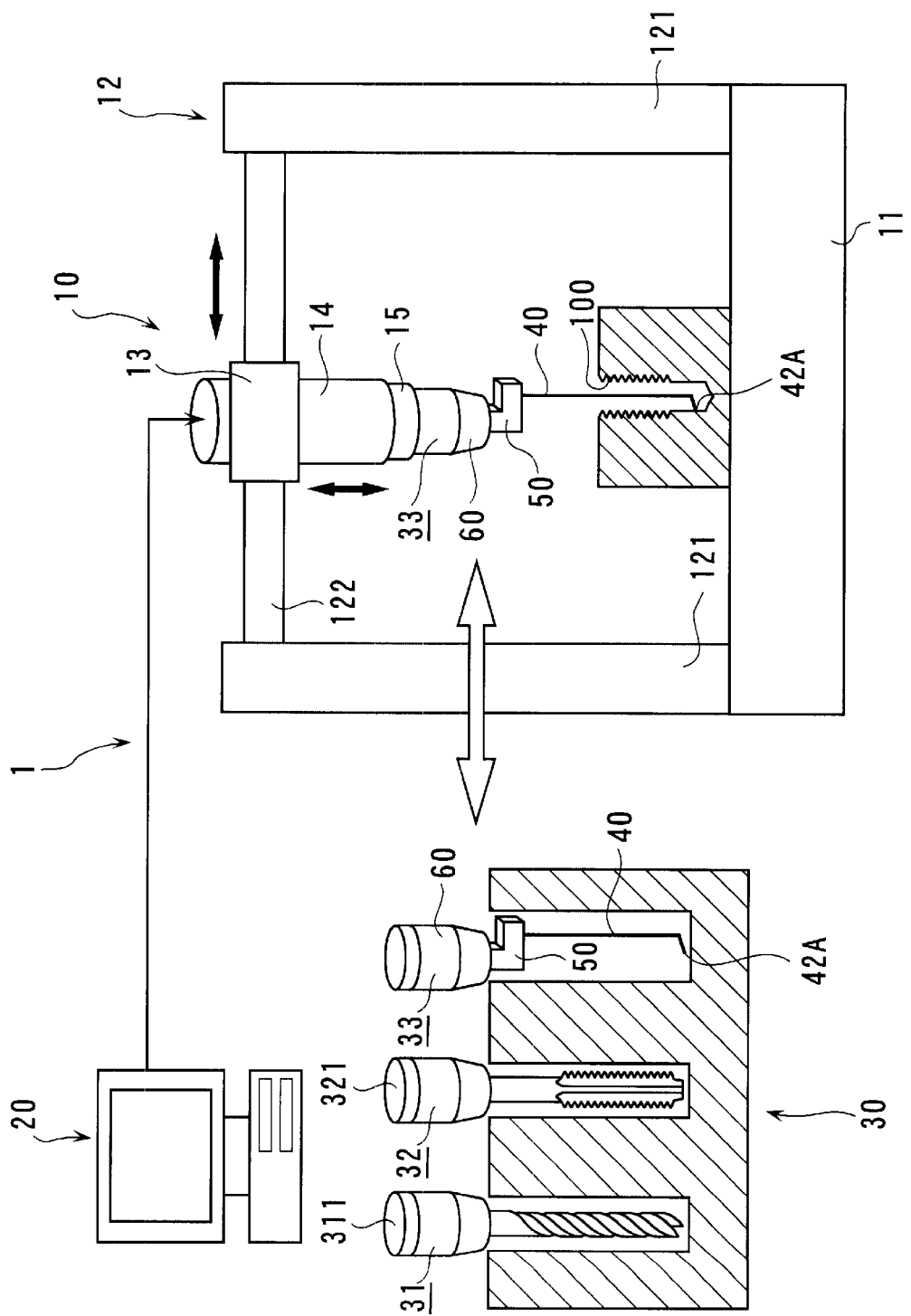
FIG. 1 is a general illustration showing a form measuring instrument according to an embodiment of the present invention.

FIG. 1 shows a general illustration of thread form measuring instrument according to an embodiment of the present invention. The thread form measuring instrument 1 has a instrument body 10 for forming the threaded hole 100 on the object and for measuring form of the formed threaded hole 100, a computer 20 for controlling the instrument body 10 and a toolbox 30 accommodating various tools 31 to 33 required for machining and measuring the threaded hole 100.

The instrument body 10 is provided with a table 11 for the workpiece (object to be machined) to be mounted, and a portal frame 12 provided upright on the table 11. The portal frame 12 has a pair of columns 121 provided upright on the table 11. A bridge 122 stretches between the columns 121 substantially horizontally and a first slider 13 is provided to the bridge 122 slidably along the longitudinal direction.

A second slider 14 is elevatably provided to the first slider 13. A rotational shaft (not shown) having a holder 15 at a lower end thereof is rotatably provided to the second slider 14. Various tools such as a drill 31, a tap 32 and a thread form measuring sensor 33 are detachably attached to the holder 15.

The holder 15 is capable of horizontal and vertical movement by the first slider 13 and the second slider 14 and is rotatable by the rotational shaft. Though not shown, the first slider 13, the second slider 14 and the rotational shaft are driven by a driving system, which is controlled by the computer 20 as a controller. Specifically, the respective driving systems are actuated by entering coordinates value or rotation frequency into the computer 20, so that the respective tools 31 to 33 attached to the holder 15 conduct various movements (horizontal and vertical movement and rotation). Incidentally, the relative movement mechanism includes the second slider 14 and a driving system for vertically moving the second slider 14.

The tools 31 to 33 accommodated in the toolbox 30 include the drill 31 as a machining tool for forming a hole before threading of the threaded hole 100 on the object to be machined, the tap 32 as a machining tool for thread-cutting (threading) the hole, and the thread form measuring sensor 33 for measuring the form of the formed threaded hole 100. The drill 31 and the tap 32 are those usually used for machining threaded holes, which are respectively provided with attachments 311 and 321 to be attached to the holder 15.

Figure 2:
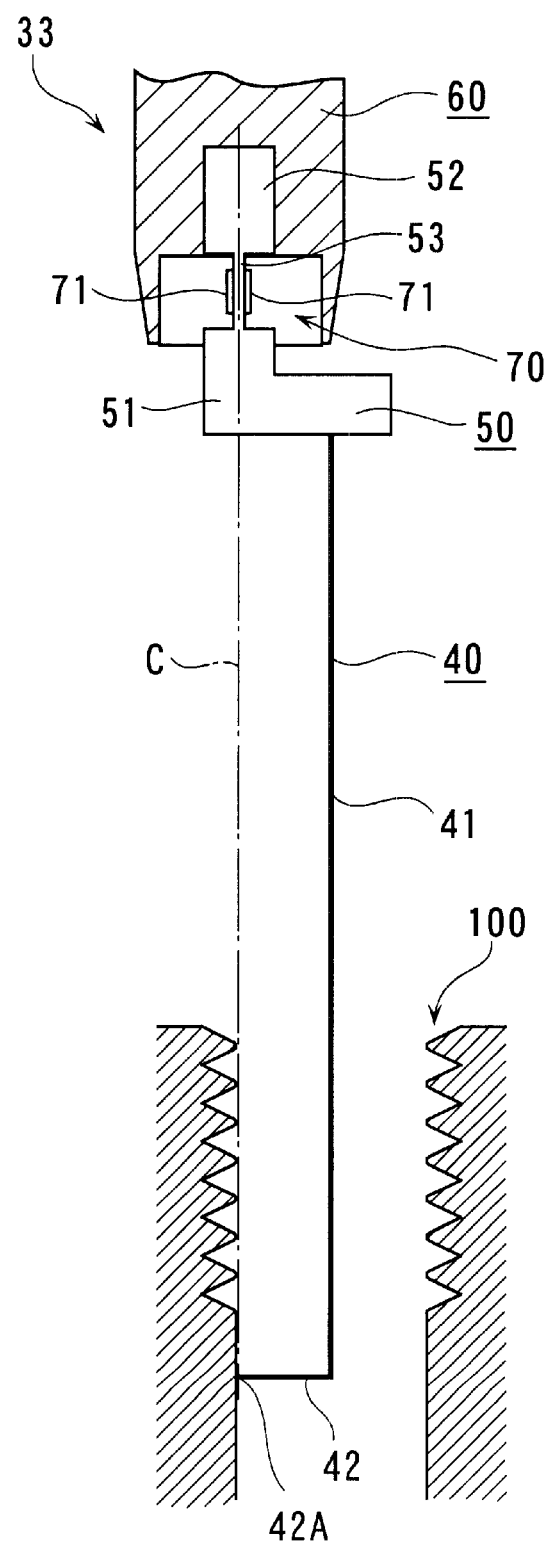
FIG. 2 is a partially crosscut side elevation showing the form measuring instrument according to the aforesaid embodiment.

As enlarged in FIG. 2, the thread form measuring sensor 33 includes a stylus 40 having a contact portion 42A to be in contact with an inner circumference of the threaded hole 100 on an end thereof, and a body 60 for holding the stylus 40 through an adaptor 50.

The stylus 40 is formed in L-shape by bending a piano wire. Specifically, the stylus 40 has a first arm 41 with an end attached to the adaptor 50 and a second arm 42 extending substantially orthogonal with the other end of the first arm 41 and having a contact portion 42A at an end thereof.

Figure 3:
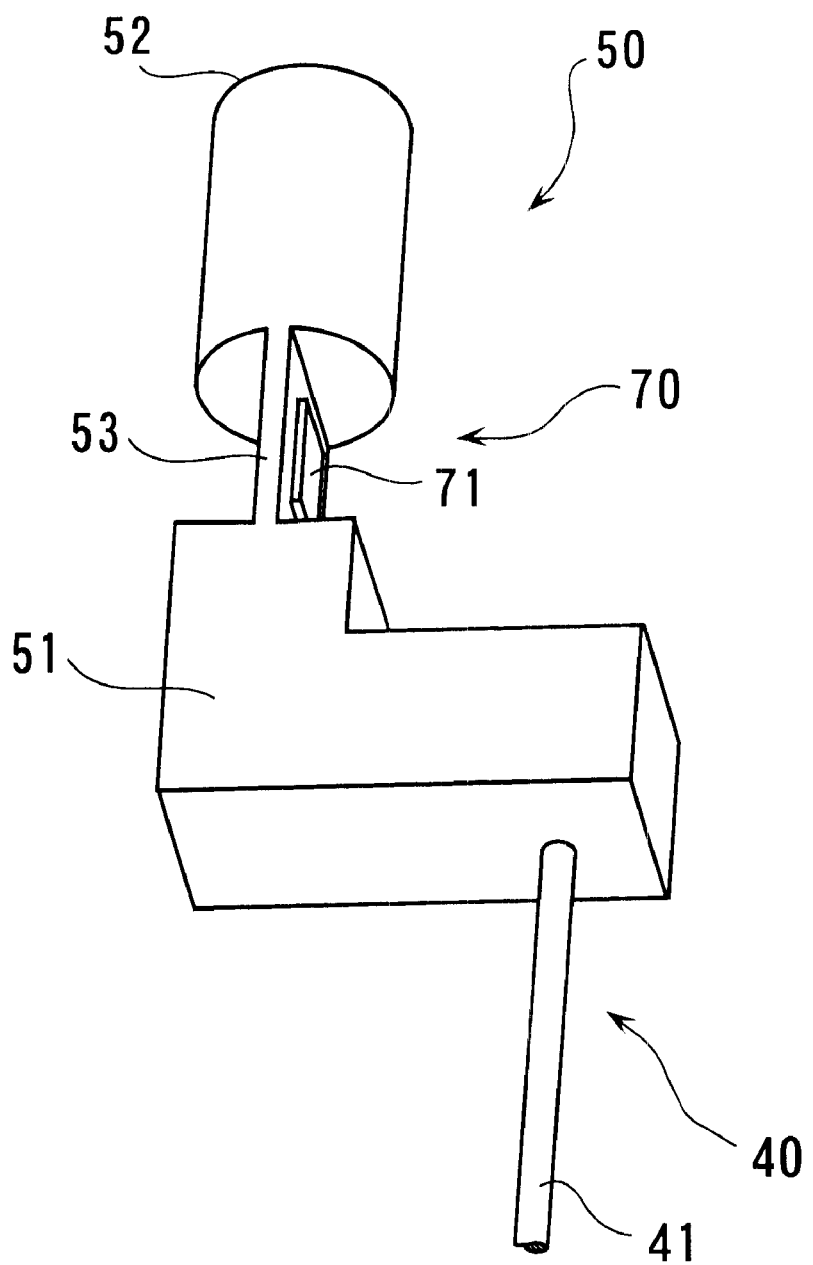
FIG. 3 is an enlarged perspective view showing an adapter of the form measuring instrument according to the aforesaid embodiment.

As enlarged in FIG. 3, the adaptor 50 has a stylus attachment 51 to which the first arm 41 of the stylus 40 is attached, a body attachment 52 to be attached to the body 60 and an elastically deformable connector 53 for connecting the stylus attachment 51 and the body attachment 52. The stylus attachment 51, the body attachment 52 and the connector 53 are integrally formed of, for instance, duralumin.

The first arm 41 of the stylus 40 is secured to the stylus attachment 51. Though not shown, the stylus 40 is secured to the stylus attachment 51 by inserting the first arm 41 into an insert hole formed on the stylus attachment 51 and fixing with fixture such as a thread or by bonding or welding.

On the other hand, the body attachment 52 is also attached to the body 60 by the fixture such as a thread or by bonding or welding.

The connector 53 is formed in a thin plate capable of elastically deformation in front and back directions, the opposing pair of peripheral ends being respectively connected to the stylus attachment 51 and the body attachment 52.

A center line C of the connector 53 (center line C extending from the stylus attachment 51 to the body attachment 52) and the first arm 41 of the stylus 40 are disposed in parallel with a predetermined interval. The direction of the predetermined interval is front and back direction of the connector 53. On the other hand, the second arm 42 is substantially parallel to the back and front direction of the connector 53, and the contact portion 42A is disposed on the center line C of the connector 53.

The connector 53 allows displacement of the stylus 40 and the stylus attachment 51 relative to the body attachment 52 (displacement in the front and back direction of the connector 53) by elastic deformation thereof in the front and back direction.

A deformation sensor 70 for detecting elastic deformation of the connector 53 is provided to the thread form measuring sensor 33.

The displacement sensor 70 detects the elastic deformation, i.e. bending strain, in the front and back direction of the connector 53 of the adaptor 50, which includes a pair of strain gauges 71 respectively attached to the front and back sides of the connector 53. Though not shown, the strain gauges 71 are integrated to a bridge circuit by being connected with a lead wire, so that the elastic deformation in the front and back direction of the connector 53 can be detected.

Next, a function of the present embodiment will be described below.

Initially, a thread hole 100 is formed on the object to be machined.

Figure 4:
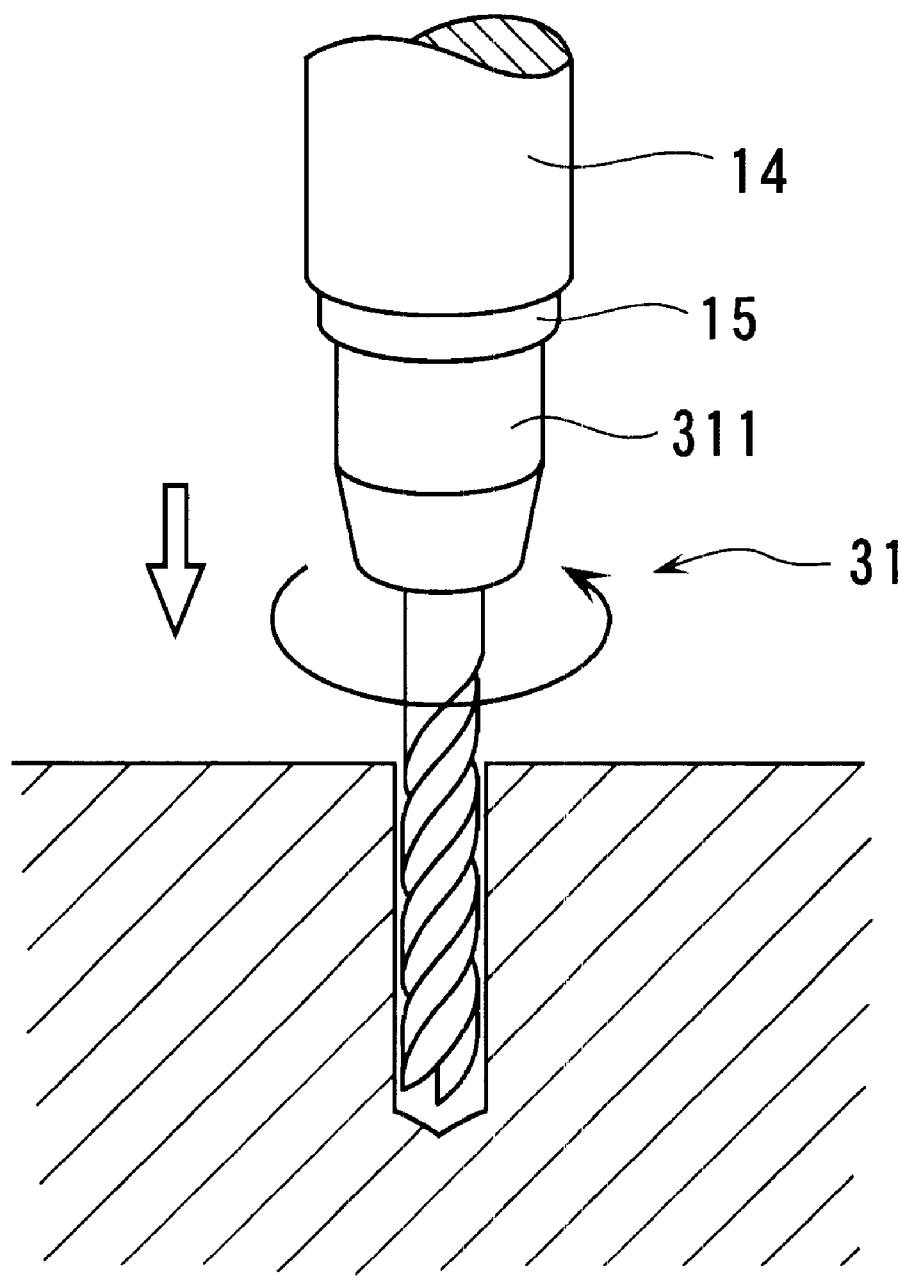
FIG. 4 is an illustration showing a function of the form measuring instrument according to the aforesaid embodiment.
Figure 5:
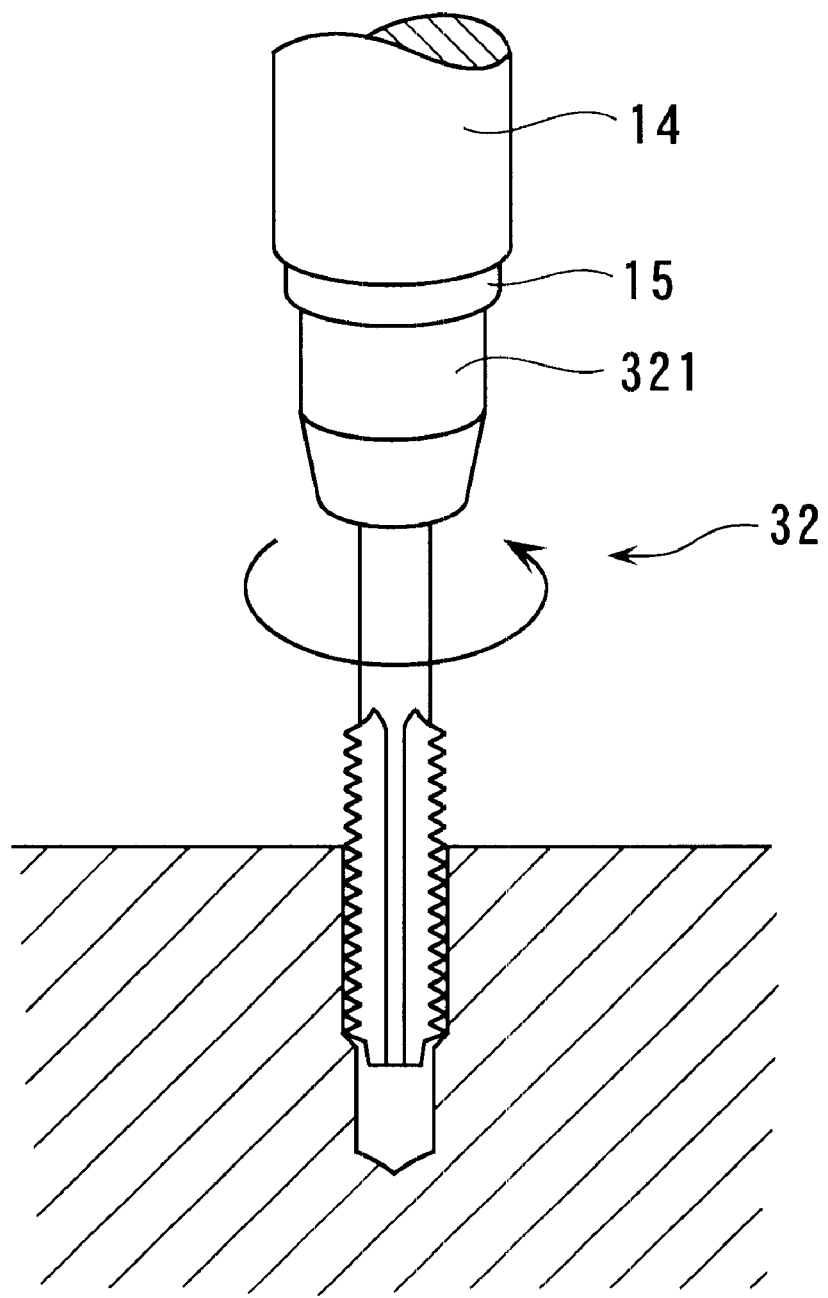
FIG. 5 is an illustration showing another function of the form measuring instrument according to the aforesaid embodiment.
Figure 6A:
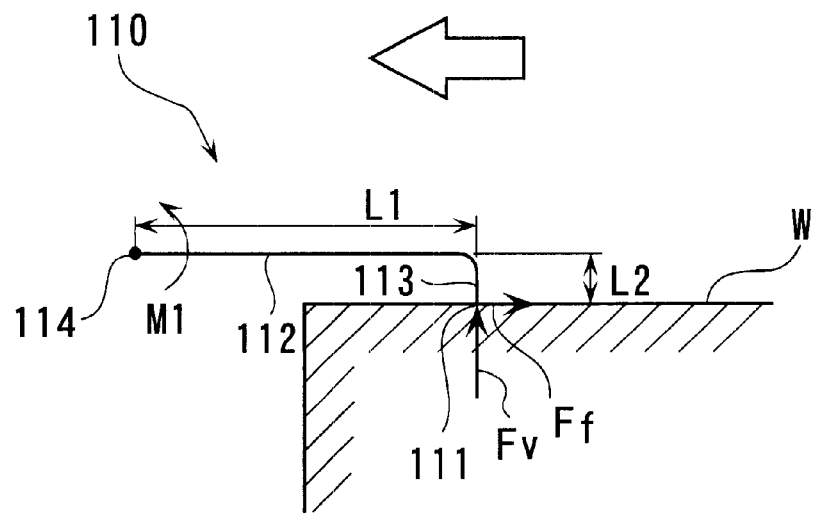
FIGS. 6(A) and 6(B) are schematic views showing a function of the present invention.
Figure 6B:
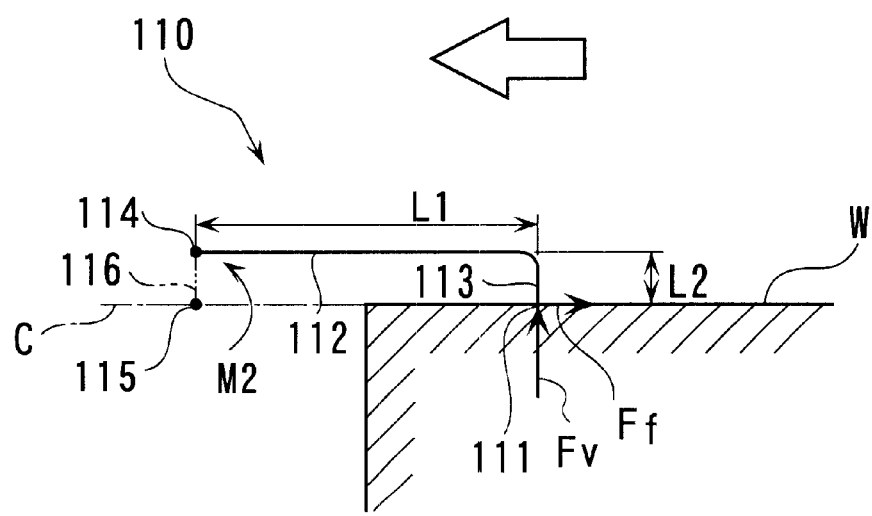

Specifically, after mounting and positioning the object to be machined on the table 11, the drill 31 is attached to the holder 15. The tools 31 to 33 may be attached and exchanged manually or, alternatively, automatically with a tool exchanger ordinarily used for machining center etc. After the drill 31 is attached to the holder 15, a hole before threading is machined on the object to be machined (see FIG. 4) and, subsequently, the drill 31 is detached from the holder 15 and the tap 32 is attached for threading (see FIG. 5) to form the threaded hole 100.

Next, after the threaded hole 100 is formed, the form of the threaded hole 100 is measured to obtain respective parameters a to d.

Specifically, the thread form measuring sensor 33 is attached to the holder 15 and the measuring sensor 33 is moved to right above the threaded hole 100. Thereafter, the measuring sensor 33 is lowered to insert the stylus 40 into the threaded hole 100. Subsequently, the measuring sensor 33 is moved horizontally, i.e. in a direction for the contact portion 42A of the stylus 40 touches the inner circumference of the threaded hole 100 so that the center line C of the connector 53 is located on an outer side than the inner circumference of the threaded hole 100. Accordingly, the contact portion 42A of the stylus 40 touches the inner circumference of the threaded hole 100. The measuring sensor 33 is moved upward, and the elastic deformation of the connector 53 in accordance with the displacement of the stylus 40 can be continuously detected by the displacement sensor 70, thus measuring form of the inner circumference of the threaded hole 100. Accordingly, thread pitch a, effective thread portion length b, incomplete thread portion c and threaded hole depth d can be measured.

According to the above-described embodiment, following effects can be obtained.

In the present embodiment, the threaded hole 100 and the thread form measuring sensor 33 are relatively moved along the axial direction (vertical direction) of the threaded hole 100 while the contact portion 42A of the stylus 40 keeps in contact with the surface of the threaded hole 100. Then, the contact portion 42A of the stylus 40 scans the inner circumference of the threaded hole 100 and displaces in a direction approximately orthogonal with the relative movement, so that the stylus attachment 51 of the adaptor 50 attached with the stylus 40 displaces in the same direction. On the other hand, since the body attachment 52 of the adaptor 50 is attached to the body 60 relatively moving along the axial direction of the threaded hole 100, the displacement direction becomes solely the relative movement direction. In other words, since the stylus attachment 51 of the adaptor 50 displaces in approximately orthogonal with the relative movement direction and the body attachment 52 does not displace relative to the body 60, the connector 53 connecting the stylus attachment 51 and the body attachment 52 elastically deforms. Accordingly, the displacement of the stylus attachment 51, i.e. the displacement of the contact portion 42A of the stylus 40 can be shown as the elastic deformation of the connector 53. Continuous inner circumference form data of the threaded hole 100 can be collected within a short time by continuously detecting the elastic deformation of the connector 53 with the deformation sensor 70.

Since the stylus 40 includes the first arm 41 attached to the stylus attachment 51 and extending along the axial direction of the threaded hole 100, and the second arm 42 extending approximately orthogonal with the first arm 41 and having the contact portion 42A, the stylus 40 can be easily inserted into the threaded hole 100 and the contact portion 42A can be securely brought into contact with the inner circumference of the threaded hole 100.

The contact portion 42A of the stylus 40 is disposed on the center line C of the connector 53 approximately parallel with the relative movement direction. Accordingly, the friction force applied to the contact portion 42A in axial direction of the connector 53 is not shown as an elastic deformation in a direction approximately orthogonal with the relative movement direction of the connector 53. Accordingly, the influence of the friction force fluctuating according to surface roughness of the workpiece etc. can be eliminated, so that only the displacement in the direction approximately orthogonal with the relative movement of the stylus 40 can be reflected on the elastic deformation of the connector 53.

The deformation sensor 70 for detecting the elastic deformation of the connector 53 includes the strain gauge 71 attached to the connector 53, so that inexpensive arrangement is possible.

Since the stylus 40 is formed by the piano wire, the stylus 40 can be arranged inexpensive and any desired form of stylus 40 corresponding to the thread form can be easily formed by bending the piano wire.

Initially, after the tap 32 is attached to the holder 15 to form the threaded hole 100 on the workpiece, the tap 32 is detached from the holder 15 and the thread form measuring sensor 33 is attached for measuring the form of the threaded hole 100.

Since the threading for finishing the threaded hole 100 in the final machined shape and the measurement required after the threading are conducted with the same instrument, the workpiece (object to be machined) is not necessary to be moved. Accordingly, the positioning and movement of the workpiece are not necessary for measurement, thus reducing measurement time.

The sequential process for forming the threaded hole 100 on the workpiece can be conducted simultaneously with measuring the form of the threaded hole 100. In other words, machining of hole before threading of the threaded hole 100, threading and form-measuring of the threaded hole 100 can be conducted sequentially, so that machining time and measurement time can be reduced.

The measuring sensor can be easily exchanged to sensors having appropriate form and size in accordance with the shape and size of the object to be measured (thread form).

Next, another embodiment of the present invention will be described below.

In the present embodiment, the structure of the thread form measuring instrument 1 is the same as in the above-described embodiment shown in FIG. 1 and description thereof is omitted. In the present embodiment, the contact pressure is controlled constant in scanning measurement of the thread form.

Specifically, also in the present embodiment, after the measuring sensor 33 is lowered to insert the stylus 40 into the threaded hole 100, the contact portion 42A of the stylus 40 is brought into contact with the inner circumference of the threaded hole 100.

Subsequently, the contact portion 42A is pressed on the measurement surface of the workpiece to apply measurement pressure so that the output of the deformation sensor 70 becomes a constant value. In the condition, the second slider 14 is raised to move the measuring sensor 33 upwardly along the measurement surface (thread) of the workpiece. At this time, the contact portion 42A displaces in accordance with the shape of the measurement surface of the workpiece (thread surface), the displacement of the contact portion 42A causing change in elastic deformation of the connector 53 and, as a result, changing output of the deformation sensor 70. The computer 20 reads the change in the output, and controls the first slider 13 to move the measurement sensor 33 in right and left direction (vertical direction relative to the measurement surface of the workpiece) so that the output becomes the constant value. As a result, the output of the displacement sensor 70 returns to the constant value and the measurement pressure also returns to the constant value. In this manner, while the measuring sensor 33 is moved in the right and left direction by controlling the first slider 13 so that the deformation sensor 70 stays constant, the measuring sensor 33 is moved upward along the measurement surface of the workpiece and the displacement of the first slider 13 and the second slider 14 is continuously read from a scale (not shown) as a coordinates value data and is registered and stored in the computer 20. Since the contact portion 42A of the measuring sensor 33 moves in accordance with the form of the measurement surface as in known scanning probe, the coordinates data represents the form of the measurement surface. Accordingly, the parameters of the thread such as the thread pitch a, effective thread portion length b, incomplete thread portion c and threaded hole depth d can be obtained.

According to the present embodiment, following effects can be obtained.

When the threaded hole 100 and the thread form measuring sensor 33 relatively move along the axial direction of the threaded hole 100 (vertical direction) while the contact portion 42A of the stylus 40 keeps in contact with the surface of the threaded hole 100, the first slider 13 is simultaneously moved in right and left direction so that the output of the deformation sensor 70 becomes constant. In other words, when the contact portion 42A displaces in a direction (right and left direction=direction orthogonal with the measurement surface) approximately orthogonal with the relative movement direction (vertical direction) in accordance with the form of the surface of the threaded hole 100, the connector 53 connecting the stylus attachment 51 and the body attachment 52 elastically deforms to alter the output value of the deformation sensor 70, causing right and left movement of the measuring sensor 33. The displacement of the contact portion 42A of the stylus 40 (vertical direction, right and left direction) can be represented as a displacement of the first slider 13 and the second slider 14. Accordingly, by continuously detecting and collecting the displacements as a coordinates value data, the continuous data of the inner circumference of the threaded hole 100 can be collected within a short time. At this time, since the stylus 40 moves parallel relative to the measurement surface, the rotation error (so-called circular error: position error caused in measurement surface direction in accordance with the separation of the contact portion from a reference surface of workpiece) occurred in rotary movement of the stylus 40 is not caused, thus enhancing accuracy of the measurement. Further, since the measurement is conducted by parallel movement not by rotary movement, the measurement range is not limited, so that a wide area can be measured with high accuracy. Further, continuous scanning measurement is possible.

Incidentally, the present invention is not restricted to the above respective embodiments, but includes modifications and improvements as long as an object of the present invention can be achieved.

For instance, though the stylus 40 itself is not elastically deformed in the above embodiments, the same measurement performance can be obtained even when the rigidity of the stylus 40 is low and the elastic deformation is caused in measuring the thread form.

Figure 7:
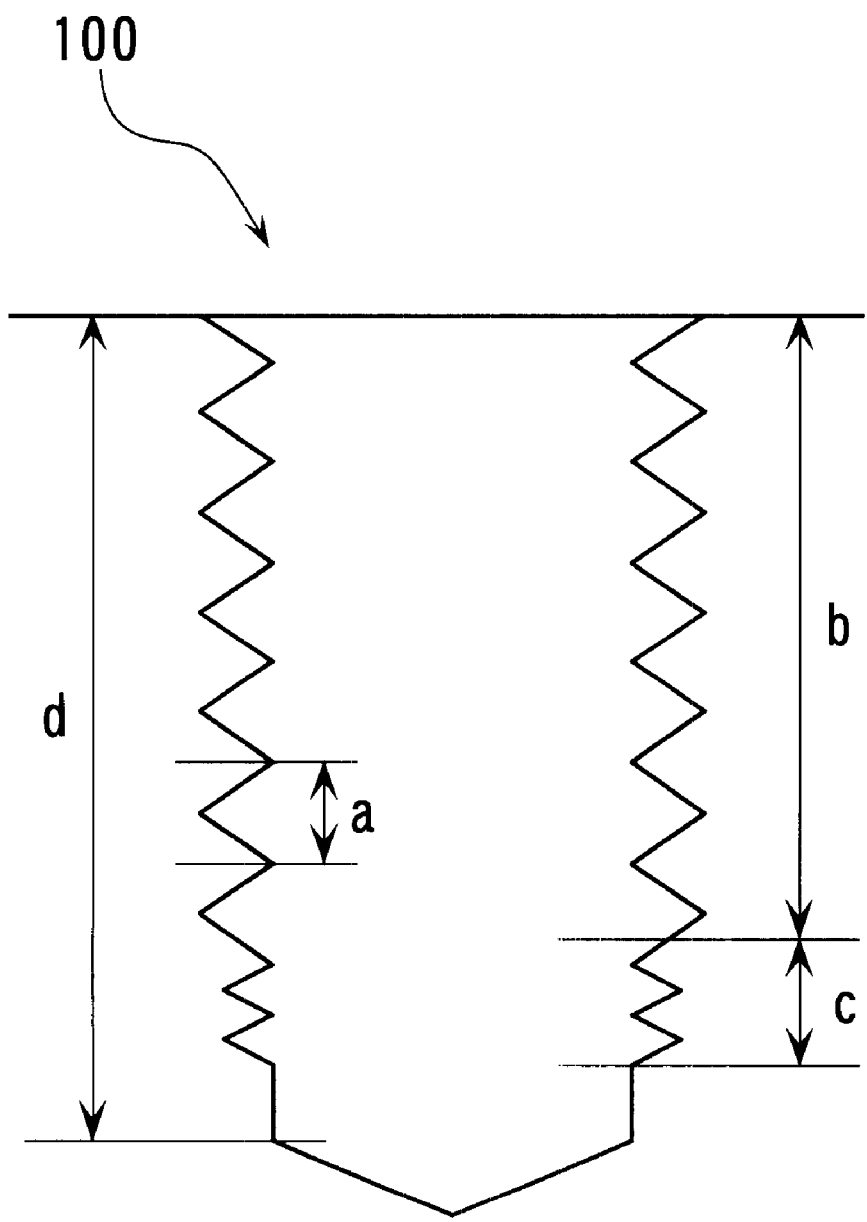
FIG. 7 is a schematic view showing a threaded hole as an object to be measured.

Specifically, when both of the stylus 40 and the connector 53 elastically deform by the displacement of the contact portion 42A in a direction orthogonal with the center line C, though the displacement of the contact portion 42A in the direction orthogonal with the center line C cannot be accurately measured, the displacement is absorbed by the elastic deformation of both of the stylus 40 and the connector 53. Accordingly, whether the contact portion 42A is displaced in the direction orthogonal with the center line C or not, or the magnitude of the displacement can be detected by the strain gauge 71. Since the parameters of the threaded hole 100 to be measured is, as shown in FIG. 7, the various parameters a to d as shown in FIG. 7, the parameters a to d can be accurately measured by detecting the existence of the displacement of the contact portion 42A in the direction orthogonal with the center line C and magnitude thereof.

By measuring the elastic deformation ratio of both of the stylus 40 and the connector 53 in advance, the displacement of the contact portion 42A can be obtained by calibrating the detected value of the strain gauge 71.

Though the thread form measuring sensor 33 and the threaded hole 100 are relatively moved in axial direction of the threaded hole 100 by the movement of the thread form measuring sensor 33 in the above-described embodiments, the threaded hole as the workpiece may be moved or, alternatively, both of the thread form measuring sensor and the threaded hole may be moved, as long as the thread form measuring sensor and the threaded hole are relatively moved.

Though the threaded hole 100 is specifically taken as a thread to be measured, the thread according to the present invention is not restricted to the threaded hole by may be a threaded shaft.

The workpiece is not restricted to the thread but may be a general two-dimensional workpiece or a three-dimensional workpiece.

What is claimed is:

1. A form measuring sensor, comprising:
   a stylus having a contact portion to be in contact with a workpiece surface at a first end;
   a body for holding the stylus through an adaptor, the adaptor including a stylus attachment for a second end of the stylus to be attached, a body attachment to be attached to the body and an elastically deformable connector for connecting the stylus attachment and the body attachment, the connector elastically deforming to allow a displacement of the stylus and the stylus attachment relative to the body attachment in accordance with a configuration of the surface of the workpiece; and
   a deformation sensor disposed to detect the elastic deformation of the connector, wherein the stylus is formed in approximate L-shape and includes a first arm extending along the surface of the workpiece with an end attached to the stylus attachment, and a second arm extending substantially orthogonal with the other end of the first arm and having the contact portion at an end thereof,
   wherein the body is relatively moved along the surface of the workpiece while the contact portion of the stylus keeps in contact with the surface of the workpiece, and
   wherein the contact portion of the stylus and the connector are disposed on an identical line approximately parallel to the relative movement direction.

2. The form measuring sensor according to claim 1, wherein the contact portion of the stylus is disposed on a center line of the connector approximately parallel to the relative movement direction.

3. The form measuring sensor according to claim 1, wherein the deformation sensor includes a strain gauge attached to the connector.

4. The form measuring sensor according to claim 1, wherein the stylus is formed of a piano wire.

5. The form measuring sensor according to claim 1, wherein the form measuring sensor measures a thread form.

6. A form measuring instrument having a form measuring sensor according to claim 1, comprising:
   a holder for the form measuring sensor to be detachably attached;
   a relative movement mechanism for relatively moving the holder along a surface of the workpiece; and
   a controller for controlling the relative movement mechanism.

7. The form measuring instrument according to claim 6, wherein the form measuring sensor measures a form of a thread.

8. The form measuring instrument according to claim 7, wherein a machining tool for threading the workpiece to form the thread is detachably attached to the holder.

9. The form measuring instrument according to claim 7, wherein a machining tool for forming a hole before threading of the thread on the workpiece is detachably attached to the holder.

10. A form measuring instrument having a form measuring sensor according to claim 1, comprising:
    a holder for the form measuring sensor to be detachably attached;
    a surface-direction relative movement mechanism for relatively moving the holder along a surface of the workpiece;
    a crosswise relative movement mechanism for relatively moving the holder in a direction intersecting the workpiece surface; and
    a controller for controlling the surface-direction relative movement mechanism and the crosswise relative movement mechanism, the controller controlling the crosswise relative movement mechanism so that an output of the deformation sensor becomes always constant.

11. The form measuring instrument according to claim 10, wherein the form measuring sensor measures a thread form.

* * * * *